(12) United States Patent
Venus et al.

(10) Patent No.: US 7,306,759 B2
(45) Date of Patent: Dec. 11, 2007

(54) APPARATUS FOR PRODUCING FASTENER ASSEMBLY WITH MOLDED INTERNAL HELICAL FLUTES

(76) Inventors: Donald W. Venus, 4702 Hawkins Rd., Richfield, OH (US) 44286; James Skufca, 19760 Battersea Rd., Rocky River, OH (US) 44116

( * ) Notice: Subject to any disclaimer, the term of this patent is extended or adjusted under 35 U.S.C. 154(b) by 61 days.

(21) Appl. No.: 10/279,411

(22) Filed: Oct. 24, 2002

(65) Prior Publication Data
US 2003/0075831 A1 Apr. 24, 2003

Related U.S. Application Data

(60) Provisional application No. 60/335,079, filed on Oct. 24, 2001.

(51) Int. Cl.
*B29C 33/44* (2006.01)
*B29C 45/44* (2006.01)

(52) U.S. Cl. .................. 264/318; 249/59; 264/328.1; 425/418; 425/577; 425/DIG. 58

(58) Field of Classification Search ............... 264/318, 264/328.1; 425/577, DIG. 58, 418, 438; 249/59
See application file for complete search history.

(56) References Cited

U.S. PATENT DOCUMENTS

| | | | | |
|---|---|---|---|---|
| 3,537,676 A | * | 11/1970 | Miller | 249/59 |
| 3,664,212 A | * | 5/1972 | Hehl | 425/577 |
| 3,694,127 A | * | 9/1972 | Takahashi et al. | 425/352 |
| 3,737,268 A | * | 6/1973 | Ryder | 425/192 R |
| 4,340,352 A | * | 7/1982 | Hayberg | 425/517 |
| 5,558,887 A | * | 9/1996 | Skufca et al. | 425/418 |
| 6,156,265 A | * | 12/2000 | Sugimoto | 425/356 |
| 6,305,563 B1 | * | 10/2001 | Elliott | 264/328.8 |
| 6,599,115 B2 | * | 7/2003 | Chalcraft et al. | 425/556 |

* cited by examiner

*Primary Examiner*—Jill L. Heitbrink
(74) *Attorney, Agent, or Firm*—Richard M. Klein; Fay Sharpe LLP

(57) ABSTRACT

A mold for producing a product with internal flutes is provided. The mold includes a mold body that defines a cavity and a shaft in proximity to the cavity. A pin assembly is receivably engaged in the shaft of the mold body. The pin assembly includes a pin with a grooved portion that has at least one helically shaped groove, a sleeve surroundingly disposed about a portion of the pin, and means to allow rotation of the pin. A gap is defined in between a portion of the walls of the shaft of the mold body and the grooved portion of the pin and the gap is partially terminated by a portion of the sleeve. A method of molding is also provided.

11 Claims, 4 Drawing Sheets

APPARATUS FOR PRODUCING FASTENER ASSEMBLY WITH MOLDED INTERNAL HELICAL FLUTES

CROSS REFERENCE TO RELATED APPLICATION

This application claims the benefit of U.S. Provisional application Ser. No. 60/335,079, filed on Oct. 24, 2001.

FIELD OF THE INVENTION

The present invention relates to the art of molding polymers. More particularly, the present invention relates to an apparatus for molding a fastener assembly for plastic components.

BACKGROUND OF THE INVENTION

The molding of fasteners that are made from polymers often involves complex tooling. For example, the intricate shape of many fasteners requires that the molds often include complex cavities with multiple movable sections to allow a fastener to be molded and then removed without damage. This use of multiple sections increases the cost of the molds and the complexity of the molding operation.

In copending U.S. patent application Ser. No. 10/279,434, filed on Oct. 24, 2002, a fastener assembly including molded internal flutes is disclosed. Molding such a fastener using an apparatus of the prior art involves significant expense, as a complex mold (as mentioned above) must be utilized. This same problem applies to other plastic products and fasteners that incorporate internal flutes.

As a result, there is a need for a molding apparatus that may overcome the disadvantages of the prior art by allowing a polymer component with internal flutes to be molded and extracted without the use of a complex and costly mold.

BRIEF SUMMARY OF THE INVENTION

In an exemplary embodiment of the present invention, a mold for producing a product with internal flutes is provided. The mold includes a mold body that defines a cavity and a shaft present in proximity to the cavity. A pin assembly is receivably engaged in the shaft of the mold body. The pin assembly includes a pin with a grooved portion that has at least one helically shaped groove, a sleeve surroundingly disposed about a portion of the pin, and means to allow rotation of the pin. A gap is defined in between a portion of the walls of the shaft of the mold body and the grooved portion of the pin and the gap is partially terminated by a portion of the sleeve.

The mold may include two halves, i.e., an upper half and a lower half, where the shaft is defined in the lower half. In addition, the angle of the groove with a radial axis of the pin is between about 30 degrees and about 360 degrees, more preferably between about 60 degrees and 180 degrees, and most preferably between about 90 degrees and 120 degrees. Of course, the at least one groove includes a plurality of grooves.

It is important to note that the pin rotates independent of the sleeve. The rotation begins when the sleeve moves toward the gap, i.e., in an upward direction. The rotation of the pin continues as the sleeve moves upward until a shoulder of the sleeve reaches a positive stop. The means to allow rotation of the pin includes a bearing. The bearing is located between a shoulder of the pin and a retaining member of the mold, where the retaining member prevents upward movement of the pin. The means to allow rotation may also include a first washer and a second washer, disposed on either side of the bearing.

In another exemplary embodiment of the present invention, an apparatus for use in a mold includes a pin with a lower end and an upper end. A pin shoulder is proximate the lower end of the pin and at least one helical groove is located at the upper end of the pin. A sleeve is disposed about a portion of the pin and means for allowing the pin to rotate within and independent of the sleeve are included.

The angle of the groove with a radial axis of the pin is in a range of about 30 degrees to 360 degrees, and the at least one helical groove includes a plurality of grooves. The means for allowing the pin to rotate includes a bearing near the pin shoulder, which may be located in between a first washer and a second washer.

In yet another exemplary embodiment of the present invention, a method of molding is provided. The method includes the steps of providing a mold that defines a cavity and a shaft proximate the cavity and inserting a pin assembly into the shaft. The pin assembly includes a pin with a grooved portion defining at least one helical groove, a sleeve disposed about a portion of the pin, and means to allow rotation of the pin. A gap is formed between a portion of the walls of the shaft and the grooved portion of the pin and at least a portion of the gap is sealed with a portion of the sleeve. Molten polymer is injected into the cavity and the gap and the polymer is cooled. The sleeve is moved in the direction of the gap, causing the pin to rotate.

The step of injecting molten polymer into the cavity and the gap may include forming at least one flute in the at least one helical groove. In addition, the rotation of the pin may be caused by the force of the at least one flute acting on the at least one helical groove as the sleeve is moved in the direction of the gap. The rotation of the pin may be facilitated by a bearing. Moreover, the sleeve may include a shoulder, where the method may also include the step of extracting a molded part when the shoulder contacts a positive stop There are other objects and features of the invention, which will be apparent from the following description and claims.

BRIEF DESCRIPTION OF THE FIGURES

The following is a brief description of the drawings, which are presented for the purpose of illustrating the invention and not for the purpose of limiting the same, and wherein.

DETAILED DESCRIPTION OF THE INVENTION

Figure 1:
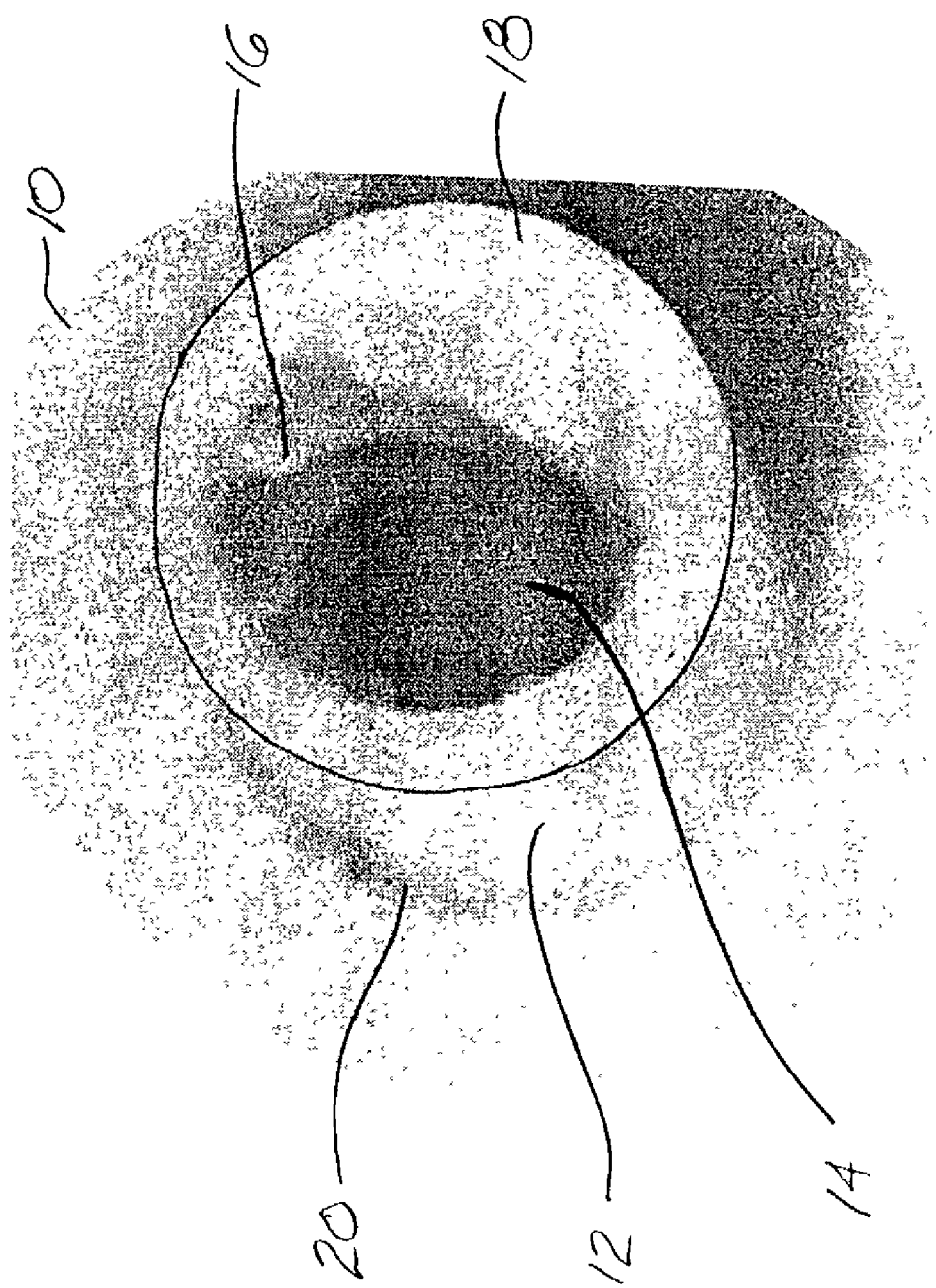
FIG. 1 is a top perspective view of a fastener assembly.
Figure 3:
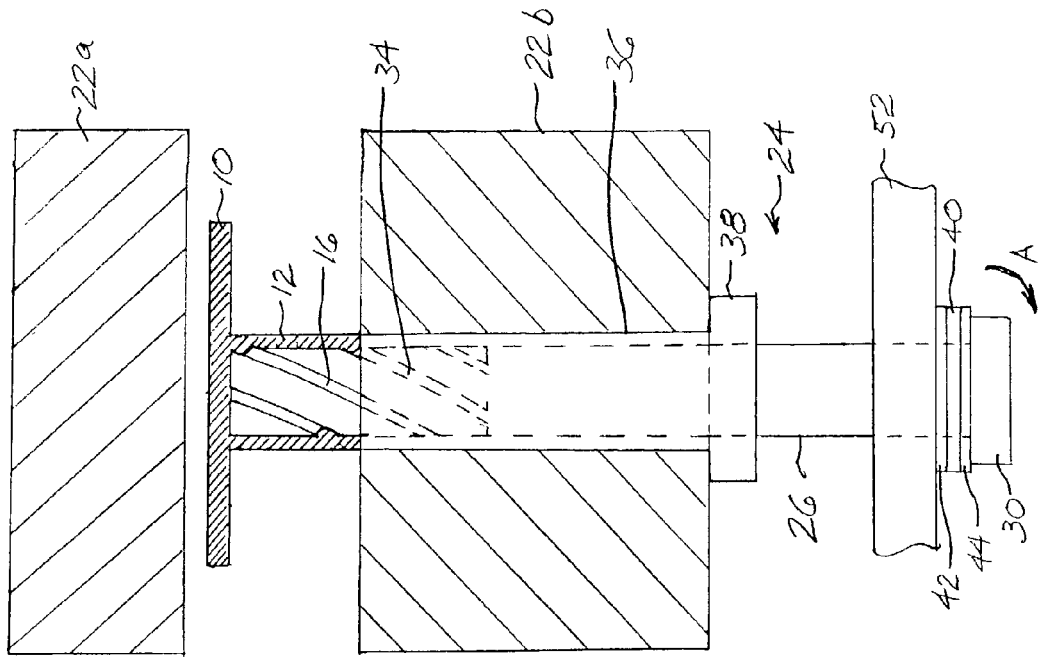
FIG. 3 is a side elevational view, partially in section, of the apparatus of FIG. 2 in a mold that is in an ejection position.

Referring now to the drawings, wherein the showings are for purposes of illustrating preferred embodiments of the invention and not for the purpose of particularly limiting the same, FIG. 1 shows a molded plastic product 10 with a fastener assembly such as a cylindrical wall 12. The cylindrical wall 12 may extend out from the plastic product 10 (as shown) or into the plastic product 10. The cylindrical wall 12 defines a longitudinal bore 14 in its inner diameter. Extending radially into the bore 14 from the wall 12 in a helical manner is at least one flute or rib 16.

The flute 16 commences at the top of the wall 12 and extends the length of the wall 22. The angle of the flute 16 with a radial axis of the cylindrical wall 22 is between about 30 degrees and about 360 degrees, more preferably between about 60 degrees and 180 degrees, and most preferably between about 90 degrees and 120 degrees. The flute 16 may be of right-hand, i.e., extending down to the right, or left-hand, i.e., extending down to the left, orientation. Of course, more than one flute 16 may be present, as shown in FIG. 1, and in such a case, the flutes 16 extend along a helical path in a spaced parallel manner.

Figure 2:
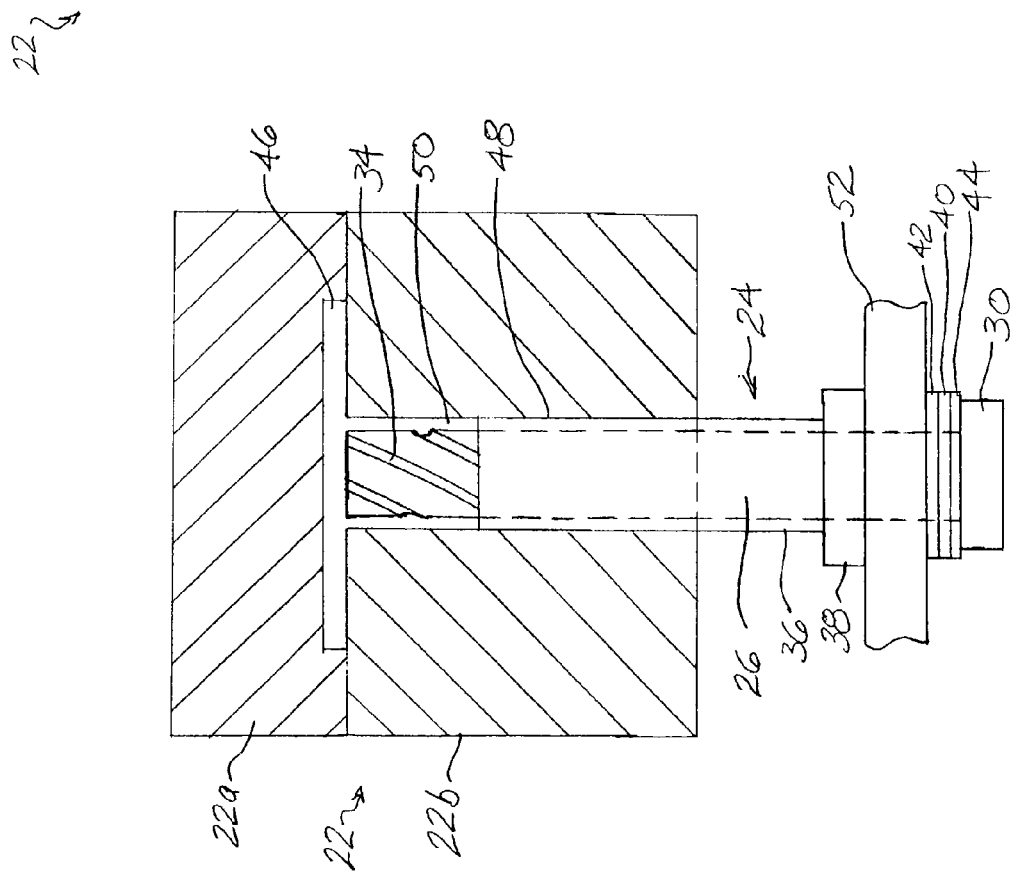
FIG. 2 is a side elevational view, partially in section, of the apparatus of the present invention in a mold that is in a molding position.

Turning now to FIG. 2, a mold 22 used to manufacture a fastener such as the cylindrical wall 12 with internal flutes 16 is shown. The mold includes an upper half 22a and a lower half 22b. A pin assembly 24 is inserted into one of the mold halves 22a of 22b, and is shown as an example in the lower mold half 22b.

Figure 4:
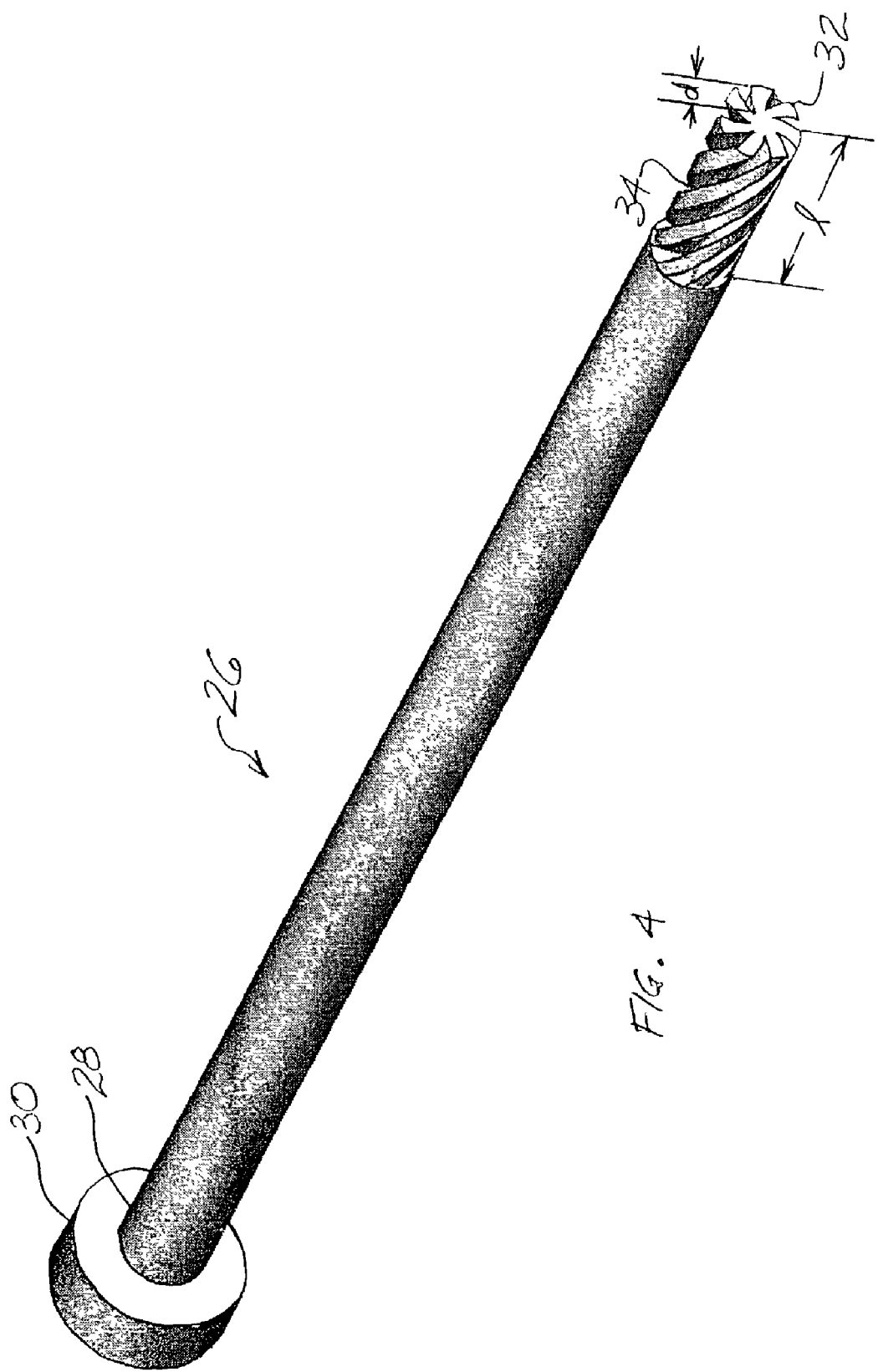
FIG. 4 is a perspective view of a component of the apparatus of the present invention.
Figure 5:
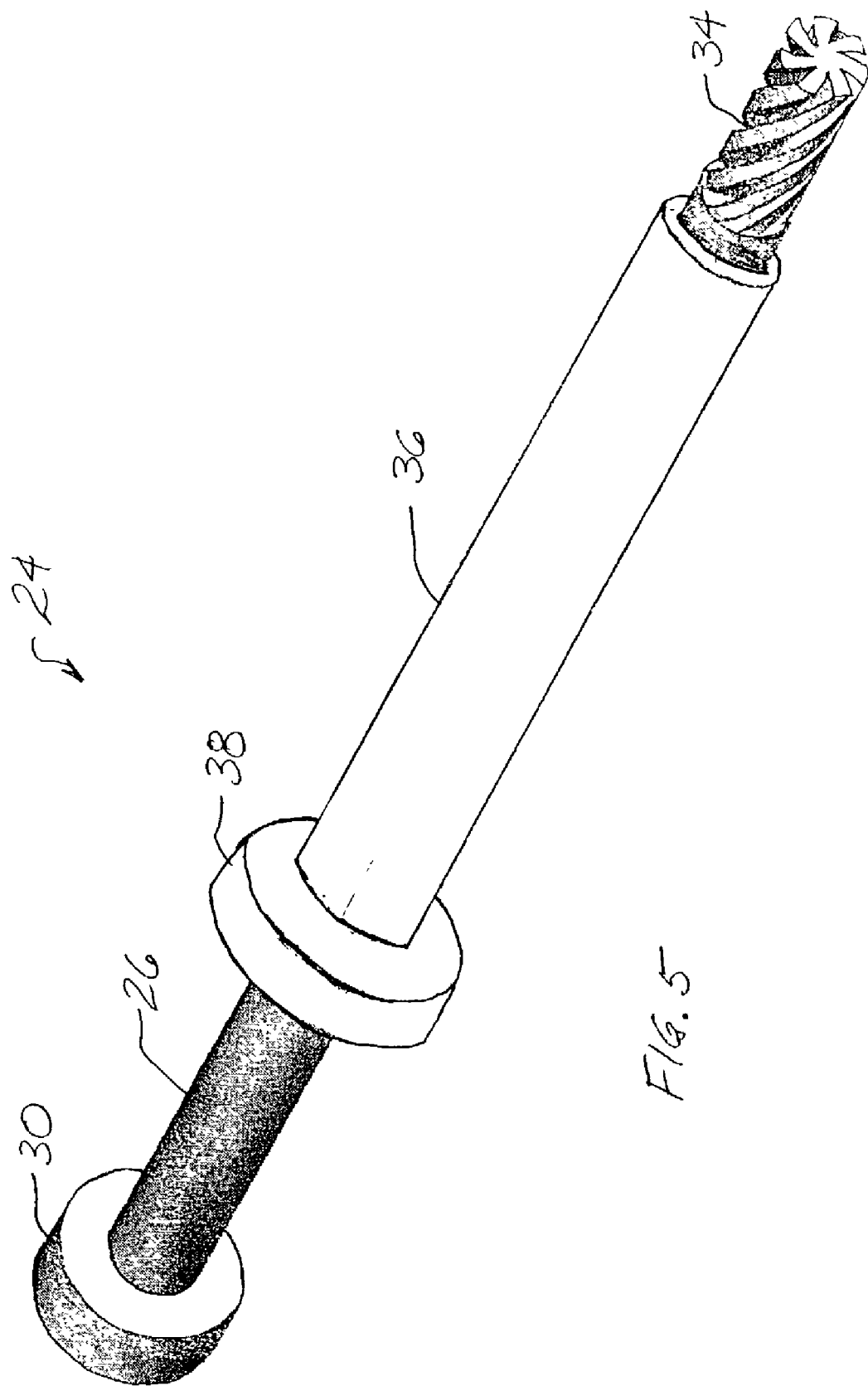
FIG. 5 is a perspective view of multiple components of the apparatus of the present invention.

With additional reference to FIGS. 4 and 5, the pin assembly 24 includes a pin 26 with a lower end 28. At the lower end 28 of the pin 26 is a shoulder 30. The pin also includes an upper end 32 at which at least one helical groove 34 is defined. There may be multiple helical grooves 34, as each helical groove 34 forms a corresponding flute 16 (referring back to FIG. 1) on the cylindrical wall 12, to be described in detail below. As a result, the number of helical grooves 34 equals the number of flutes 16 to be formed. The grooves 34 extend from the upper end 32 of the pin 26 down the pin 26 a distance l that corresponds to the desired distance that the flutes 16 on the cylindrical wall 12 will extend. Each groove 34 is of a depth d that generally corresponds to the height of the flute 16 that it forms.

As shown in FIG. 5, a sleeve 36 slides over the pin 26 and has an inner diameter that is slightly larger than the outer diameter of the pin 26 in order to allow the sleeve to slide over and rotate about the pin 26 without excessive wobble or lateral movement. The sleeve includes a shoulder 38, the purpose of which will be described below.

Returning to FIG. 2, the pin assembly 24 also includes means to allow rotation of the pin 26, such as a bearing 40 that is located on the pin 26 between a first hardened washer 42 and a second hardened washer 44. The second hardened washer 44 may be in contact with the shoulder 30 of the pin 26.

The molding process involves insertion, typically by injection, of a molten polymeric material into a cavity 46 that is defined by the upper mold half 22a, which will form the molded plastic product 10 (referring back to FIG. 1). The upper mold half 22a is in close contact with the lower mold half 22b, which defines a shaft 48 for insertion of the pin assembly 24 in proximity with the cavity 46. When the pin assembly 24 is inserted, a gap 50 is present in between the wall of the shaft 48 and the grooved portion 34 of the pin 26. The gap 50 is terminated by the upper rim of the sleeve 36, proximate the end of the grooves 34 in the pin 26.

When molten polymer flows into the cavity 46, it continues to flow into the gap 50, which forms the cylindrical wall 12 (referring back to FIG. 1). The molten material also flows into the grooves 34 on the pin 26, thus forming the flutes 16 on the cylindrical wall 12.

With reference to FIG. 5, when the molding process is complete, i.e., the polymer is cool enough to hold its shape and may thus be extracted, the upper mold half 22a is moved away from the lower mold half 22b. The formed product 10 is exposed, but the fastener 12 must be forced out of the lower mold half 22 without damage to the helical flutes 16, as they are surrounded by the grooves 34 in the pin 26. To accomplish this, the sleeve 36 is caused to move upward, sliding along the pin 26. As the sleeve 36 moves, the pin 26 is free to rotate separately from the sleeve 38 in a direction A that corresponds to the orientation of the flutes 16. In this manner, the product 10 and the cylindrical wall 12 move upward and the flutes 16 slide along and up out of the grooves 34.

The rotation of the pin 26 is facilitated by at least a partial vertical securing of the pin 26 by a retaining member 52. As the sleeve 36 moves upward, the retaining member 52 prevents the pin from moving upward. The force of the flutes 16 pressing against the grooves 34 of the pin 26, which is caused by the vertical movement of the sleeve 36, is essentially allowed to be converted to rotational motion by the bearing 40 that is secured between the washers 42 and 44, which are in turn secured by the retaining member 52 and the shoulder 30 of the pin 26. The thrust bearing 40 facilitates the rotation of the pin 26, allowing extraction of the product 10 and the cylindrical wall 12 without damage to the flutes 16.

The extraction is complete when the shoulder 38 of the sleeve 36 contacts a positive stop, such as a portion of the lower half of the mold 22b. The sleeve 36 is of a length that corresponds to the distance of the shaft 48, thereby forcing the cylindrical wall 12 substantially out of the lower half of the mold 22b.

It is important to note that the retaining member 52 may be a separate member, or it may be an integral component of the lower half of the mold 22b. Also, the angle of the flutes 16, and hence the grooves 34, causes the force of the sleeve 36 moving upward to generate a lateral force component that gives rise to the rotation of the pin 26 on the thrust bearing 40. Moreover, the angle of the flutes 16 and the grooves 34 allows the cylindrical wall 12 to move upward as the pin 26 rotates and the flutes 16 slide along the grooves 34.

The use of the bearing 40 and an axially oriented design allow the pin 26 to rotate in either a clockwise or counter-clockwise direction, depending on the orientation of the grooves 34 and the corresponding flutes 16. The compact and uniaxial design of the pin assembly 24 allows the assembly 24 to be easily inserted into a mold 22 and used interchangeably on different molds. The design also allows the use of different pins with alternative groove configurations in one mold 22, eliminating or reducing the need to construct different molds for each type of fastener.

The invention has been described with reference to preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of molding, comprising the steps of:
   providing a mold defining a cavity and a shaft proximate the cavity;
   inserting a pin assembly into the shaft, wherein the pin assembly includes a pin comprising a grooved portion defining at least one helical groove located at an upper end of the pin and a pin shoulder located at a lower end of the pin, a sleeve disposed about a portion of the pin, and means to allow rotation of the pin, wherein the pin is free to rotate independent of the sleeve;

forming a gap between a portion of the walls of the shaft and the grooved portion of the pin;

sealing at least a portion of the gap with a portion of the sleeve;

injecting molten polymer into the cavity and the gap;

cooling the polymer; and moving the sleeve in the direction of the gap, thereby causing the pin to rotate.

2. The method of molding of claim 1, wherein the step of injecting molten polymer into the cavity and the gap includes forming at least one flute in the at least one helical groove.

3. The method of molding of claim 2, wherein the rotation of the pin is caused by the force of the at least one flute acting on the at least one helical groove as the sleeve is moved in the direction of the gap.

4. The method of molding of claim 1, wherein the sleeve includes a shoulder and the method further comprises the step of extracting a molded part when the shoulder contacts a positive stop.

5. A mold for producing a product with internal flutes, comprising:

a mold body defining a cavity and a shaft in proximity to the cavity;

a pin assembly receivably engaged in the shaft of the mold body, the pin assembly including a pin comprising a grooved portion with at least one helically shaped groove located at an upper end of the pin and a pin shoulder located at a lower end of the pin, a sleeve surroundingly disposed about a portion of the pin, and means to allow rotation of the pin, wherein the pin is free to rotate independent of the sleeve; and a gap defined between a portion of the walls of the shaft of the mold body and the grooved portion of the pin, wherein the gap is partially terminated by a portion of the sleeve.

6. The mold for producing a product of claim 5, wherein the mold body includes an upper half and a lower half and the shaft is defined in the lower half.

7. The mold for producing a product of claim 5, wherein the angle of the groove with a radial axis of the pin is between about 30 degrees and about 360 degrees.

8. The mold for producing a product of claim 5, wherein the at least one groove is a plurality of grooves.

9. The mold for producing a product of claim 5, wherein the sleeve includes a shoulder and the sleeve is able to move upward along the pin until the shoulder reaches a positive stop.

10. The mold for producing a product of claim 5, further comprising a bearing to allow rotation of the pin and a retaining member to prevent upward movement of the pin.

11. The mold for producing a product of claim 10, wherein the bearing is located in between the pin shoulder and the retaining member.

* * * * *